US012632423B2

(12) United States Patent
Li et al.

(10) Patent No.: US 12,632,423 B2
(45) Date of Patent: May 19, 2026

(54) DYNAMIC QUERY RESOURCE CONTROL

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Zhe Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 17/488,411

(22) Filed: Sep. 29, 2021

(65) Prior Publication Data

US 2023/0099901 A1 Mar. 30, 2023

(51) Int. Cl.
G06F 16/21 (2019.01)
G06F 11/34 (2006.01)
(Continued)

(52) U.S. Cl.
CPC .......... G06F 16/21 (2019.01); G06F 11/3409 (2013.01); G06F 11/3457 (2013.01);
(Continued)

(58) Field of Classification Search
CPC .. G06F 16/21; G06F 16/2458; G06F 16/2358; G06F 40/205; G06F 11/3409; G06F 11/3457
(Continued)

(56) References Cited

U.S. PATENT DOCUMENTS

2005/0125427 A1 6/2005 Dageville
2013/0054603 A1* 2/2013 Birdwell ............. G06F 16/2465
707/738

(Continued)

FOREIGN PATENT DOCUMENTS

CN 104820663 A 8/2015

OTHER PUBLICATIONS

"Managing Long-Running Queries;" Stefan Krompass, Harumi Kuno, Jan et Al. Wiener, Kevin Wilkinson, Umeshwar Dayal, Alfons Kemper; ACM 2009; Russia.*

(Continued)

*Primary Examiner* — Giovanna B Colan
(74) *Attorney, Agent, or Firm* — Shackelford, McKinley & Norton, LLP

(57) ABSTRACT

A computer implemented method for identifying problematic database operations includes identifying database transactions which exhibit performance issues and corresponding parse trees, transforming corresponding parse trees to create historical descriptor arrays, detecting a new database transaction, generating a new descriptor array corresponding to the new database transaction, analyzing the new descriptor array and the historical descriptor arrays to determine whether the new descriptor array indicates a performance issue corresponding to the new database transaction, and responsive to determining that the new descriptor array indicates a performance issue, adding the new database transaction to a resource controlled pool. The method may additionally comprise encoding one or more data items associated with the database. The method may additionally include sending the new database transaction to a virtual database simulation to simulate the new database transaction's performance, and providing the simulation results to a feedback database system.

20 Claims, 12 Drawing Sheets

(51) Int. Cl.
  *G06F 16/23* (2019.01)
  *G06F 16/2458* (2019.01)
  *G06F 40/205* (2020.01)

(52) U.S. Cl.
  CPC ...... *G06F 16/2358* (2019.01); *G06F 16/2458*
  (2019.01); *G06F 40/205* (2020.01)

(58) Field of Classification Search
  USPC .......................................................... 707/803
  See application file for complete search history.

(56) References Cited

U.S. PATENT DOCUMENTS

| | | | | |
|---|---|---|---|---|
| 2016/0147888 | A1* | 5/2016 | Nguyen | G06F 16/2471 |
| | | | | 707/707 |
| 2019/0102437 | A1* | 4/2019 | Patthak | G06F 16/2453 |
| 2021/0158176 | A1* | 5/2021 | Wan | G06F 16/9024 |

OTHER PUBLICATIONS

"Resource Governor Resource Pool", Microsoft, SQL Docs, Oct. 20, 2017, 8 pages, <https://docs.microsoft.com/en-us/sql/relational-databases/resource-governor/resource-governor-resource-pool?view=sql-server-ver15>.

Authors et. al.: Disclosed Anonymously, "SQL Transformation Layer—Method and process to manipulate SQL statements before they hit the database without code modifications", An IP.com Prior Art Database Technical Disclosure, IP.com No. IPCOM000260436D, IP.com Electronic Publication Date: Nov. 22, 2019, 6 pages.

Krompass et al., "Managing Long-Running Queries", EDBT 2009, Mar. 24-26, 2009, Saint Petersburg, Russia, pp. 132-143.

Sharif, Ashraf, "Dealing with MySQL Long Running Queries", Severalnines, Mar. 28, 2019, 11 pages, <https://severalnines.com/database-blog/dealing-mysql-long-running-queries>.

Zahir et al., "Access Plan Recommendation Using SQL Queries Similarity", WSEAS Transactions on Computers, vol. 14, 2015, pp. 638-645.

* cited by examiner

200

SQL:
SELECT A.C2 + B.C2, A.C3
FROM T1 AS A,
    T2 AS B,
WHERE  A.C1 = B.C1
    AND A.C3 > 20

304A

DDL:
Create Table T1
(C1 Char(10), C2 Int, C3 Int);

Create Table T2
(C1 Char(10), C2 Int);

Create Index IDX_1 On T2(C1);

304B

306

DYNAMIC QUERY RESOURCE CONTROL

BACKGROUND

The present invention relates generally to the field of database management, and more specifically, to identifying problematic SQL transactions.

Structured Query Language, commonly referred to as SQL, is a domain-specific language used in programming and designed for managing data held in relational database management systems or for stream processing in relational data stream management systems. SQL transactions are sequences of operations performed, using one or more SQL statements, on a database as a single logical unit of work. The effects of all SQL statements in a transaction can be either all committed (applied to the database), or all rolled back (undone from the database).

SUMMARY

As disclosed herein, a computer implemented method for identifying problematic database operations includes identifying database transactions which exhibit performance issues and corresponding parse trees, transforming corresponding parse trees to create historical descriptor arrays, detecting a new database transaction, generating a new descriptor array corresponding to the new database transaction, analyzing the new descriptor array and the historical descriptor array to determine whether the new descriptor array indicates a performance issue corresponding to the new database transaction, and responsive to determining that the new descriptor array indicates a performance issue, adding the new database transaction to a resource controlled pool. The method may additionally comprise encoding one or more data items associated with the database. The method may additionally include sending the new database transaction to a virtual database simulation to simulate the new database transaction's performance, and providing the simulation results to a feedback database system. A computer program product and computer system corresponding to the method are also disclosed.

DETAILED DESCRIPTION

Figure 1:
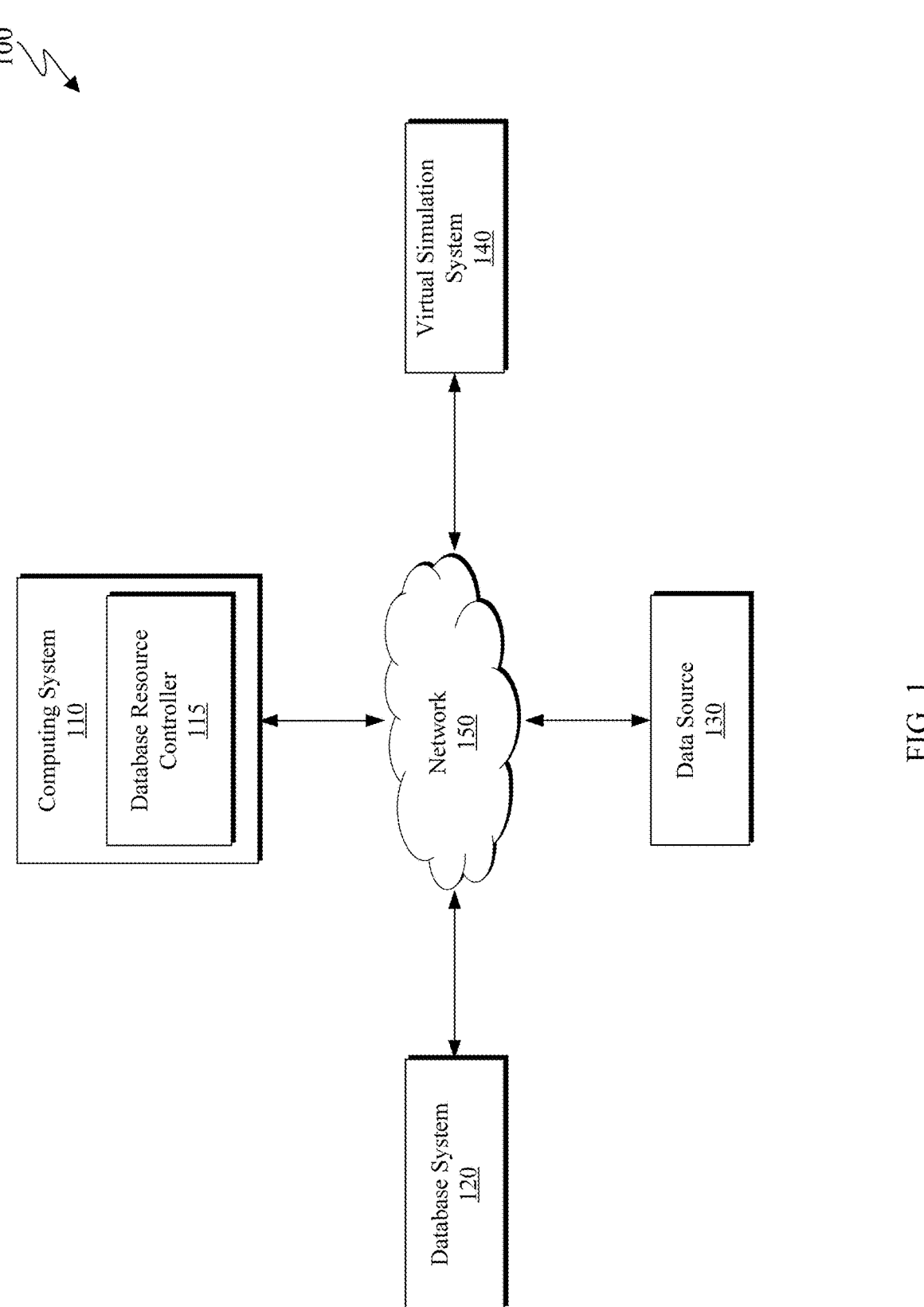
FIG. 1 is a block diagram depicting a database management system in accordance with at least one embodiment of the present invention.

Long running SQL transactions can significantly impact database system performance. Therefore, resource limit and control may be implemented to avoid system overload. However, current resource control system engagement fails to proactively detect or prevent problematic SQL transactions, as the systems require a long running SQL transaction be detected before the transaction is ceased, meaning that the resources have already been allocated for at least the duration of said long running SQL transaction. Additionally, in many cases, database administrators must monitor systems and kill SQL transactions manually. Furthermore, it can be difficult to define rigid rules within a resource control system, since the data distribution within database and SQL usages can be very diverse, and syntax can vary considerably.

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Through the more detailed description of some embodiments of the present disclosure in the accompanying drawings, the above and other objects, features and advantages of the present disclosure will become more apparent, wherein the same reference generally refers to the same components in the embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the context of the present application, where embodiments of the present invention constitute a method, it should be understood that such a method may be a process for execution by a computer (i.e., may be a computer-implementable method). The various steps of the method may therefore reflect various parts of a computer program (e.g., various parts of one or more algorithms).

With respect to embodiments as described herein, the term "matrix" is utilized as an exemplary data format, but it should be appreciated that the methods and mechanisms as described may be executed with respect to arrays or any number of additional data arrangements. Generally, the methods as described may be executable with respect to any number of dataset formats.

The present invention will now be described in detail with reference to the Figures. Implementation of embodiments of the invention may take a variety of forms, and exemplary implementation details are discussed subsequently with reference to the Figures.

FIG. 1 is a block diagram depicting a database management system 100 in accordance with at least one embodiment of the present invention. As depicted, database management system 100 includes computing system 110, database system 120, data source 130, virtual simulation system 140, and network 150. Database management system 100 may enable improved identification of potentially problematic SQL transactions.

Computing system 110 can be a desktop computer, a laptop computer, a specialized computer server, or any other computer system known in the art. In some embodiments, computing system 110 represents computer systems utilizing clustered computers to act as a single pool of seamless resources. In general, computing system 110 is representative of any electronic device, or combination of electronic devices, capable of receiving and transmitting data, as described in greater detail with regard to FIG. 4. Computing system 110 may include internal and external hardware components, as depicted and described in further detail with respect to FIG. 4.

As depicted, computing system 110 includes database resource controller 115. Database resource controller 115 may be configured to monitor database system 120 for a resource cost pattern corresponding to execution of one or more transactions. Additionally, database resource controller 115 may be configured to execute a database management method. One example of an appropriate database management method is described with respect to FIG. 2.

Database system 120 may be configured to store received information and can be representative of one or more databases that give permissioned access to computing system 110 or publicly available databases. In general, database 120 can be implemented with a tape library, optical library, one or more independent hard disk drives, or multiple hard disk drives in a redundant array of independent disk (RAID).

Data source 130 may be any source via which data is available. In at least some embodiments, data source 130 refers to one or more additional databases configured to store received information, and can be implemented with a tape library, optical library, one or more independent hard disk drives, or multiple hard disk drives in a redundant array of independent disk (RAID). Data source 130 may additionally refer to a stream of data accessible by computing system 110.

Virtual simulation system 140 may be a system configured to test one or more SQL transactions and verify the performance of said one or more SQL transactions. In at least some embodiments, virtual simulation system 140 is capable of simulating the execution of one or more queries associated with the one or more SQL transactions. Accordingly, virtual simulation system 140 may be configured to verify proper functioning of said SQL transactions by comparing one or more simulated results to one or more expected results corresponding to the SQL transactions. Virtual simulation system 140 may additionally be configured to provide an indication of whether or not the simulated results indicate proper execution of the SQL transactions.

Network 150 can be, for example, a local area network (LAN), a wide area network (WAN) such as the Internet, or a combination of the two, and include wired, wireless, or fiber optics connections. In general, network 150 can be any combination of connections and protocols that will support communications between any of computing system 110, database system 120, data source 130, and virtual simulation system 140.

Figure 2:
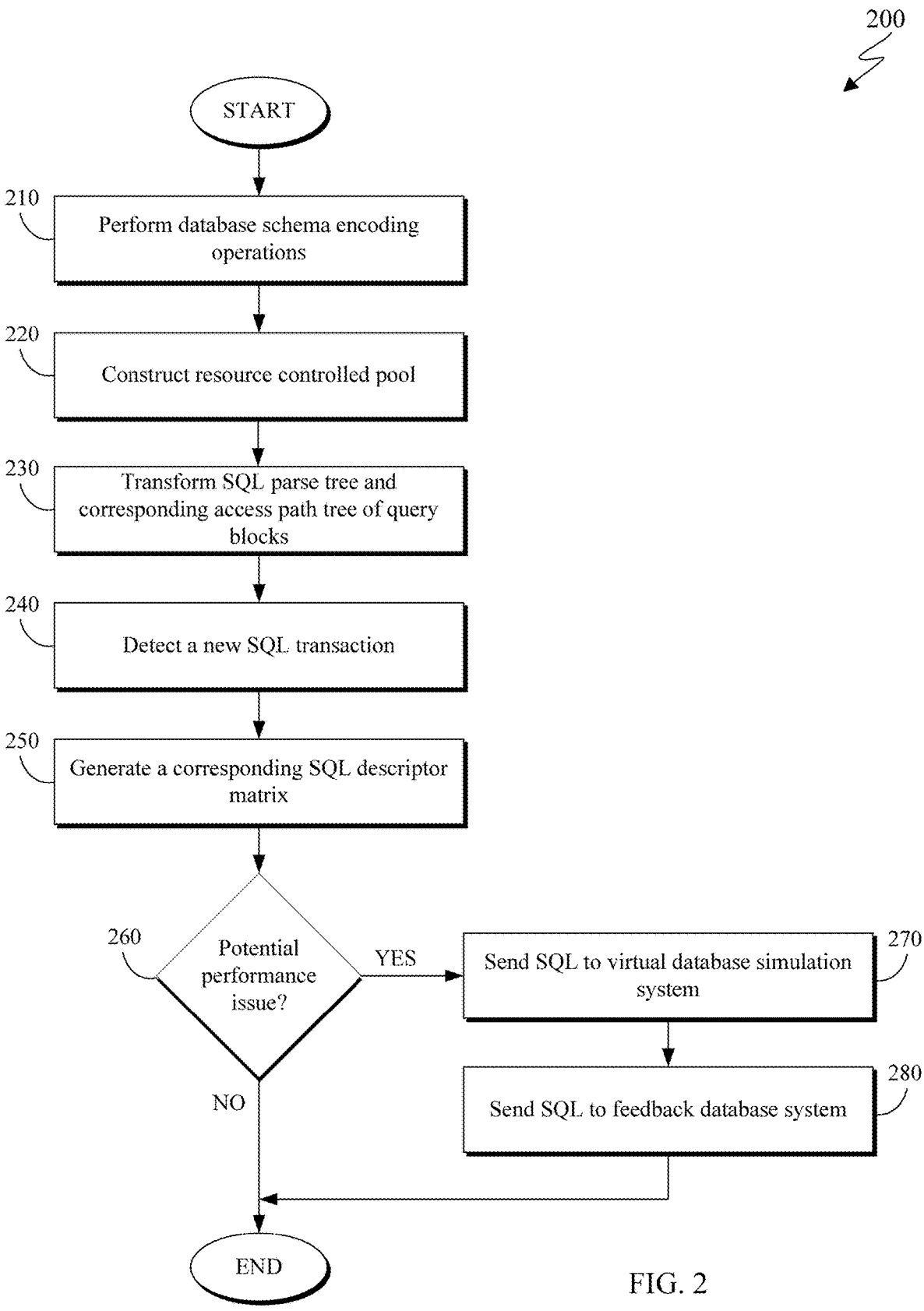
FIG. 2 is a flowchart depicting a database management method in accordance with at least one embodiment of the present invention.

FIG. 2 is a flowchart depicting a database management method 200 in accordance with at least one embodiment of the present invention. As depicted, database management method includes performing (210) database schema encoding operations, constructing (220) a resource-controlled pool of transactions, transforming (230) a SQL parse tree and corresponding access path tree, detecting (240) a new SQL transaction, generating (250) a SQL descriptor matrix corresponding to the new SQL transaction, determining (260) whether a potential performance issue exists, sending (270) the SQL transaction to a virtual database simulation system, and sending (280) the simulation results to feedback database system.

Figure 3A:
FIG. 3A depicts a set of encoded elements in accordance with one embodiment of the present invention.
Figure 3A:
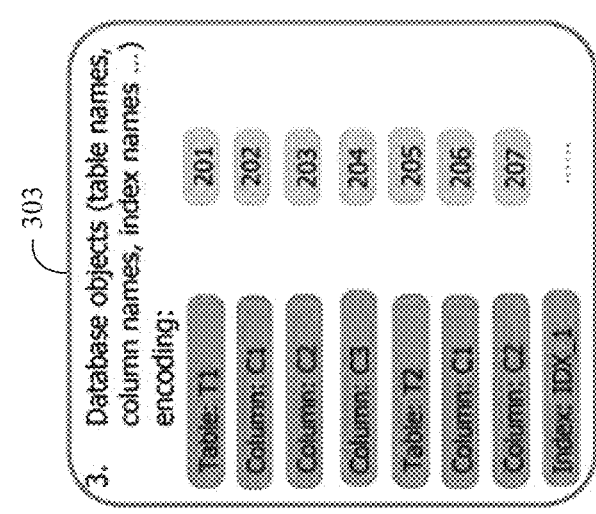
Figure 3A:
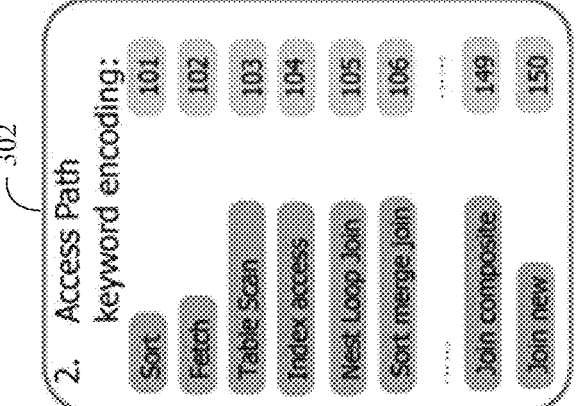
Figure 3A:
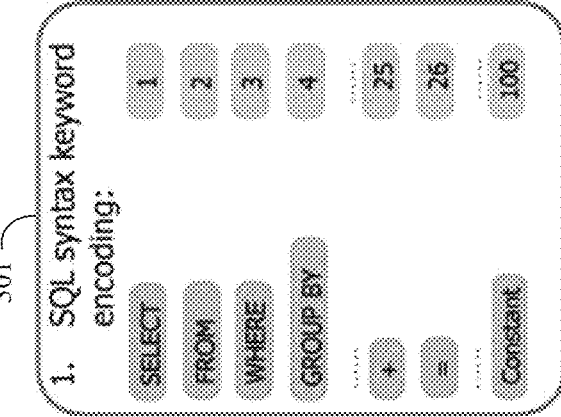
Figure 3B:
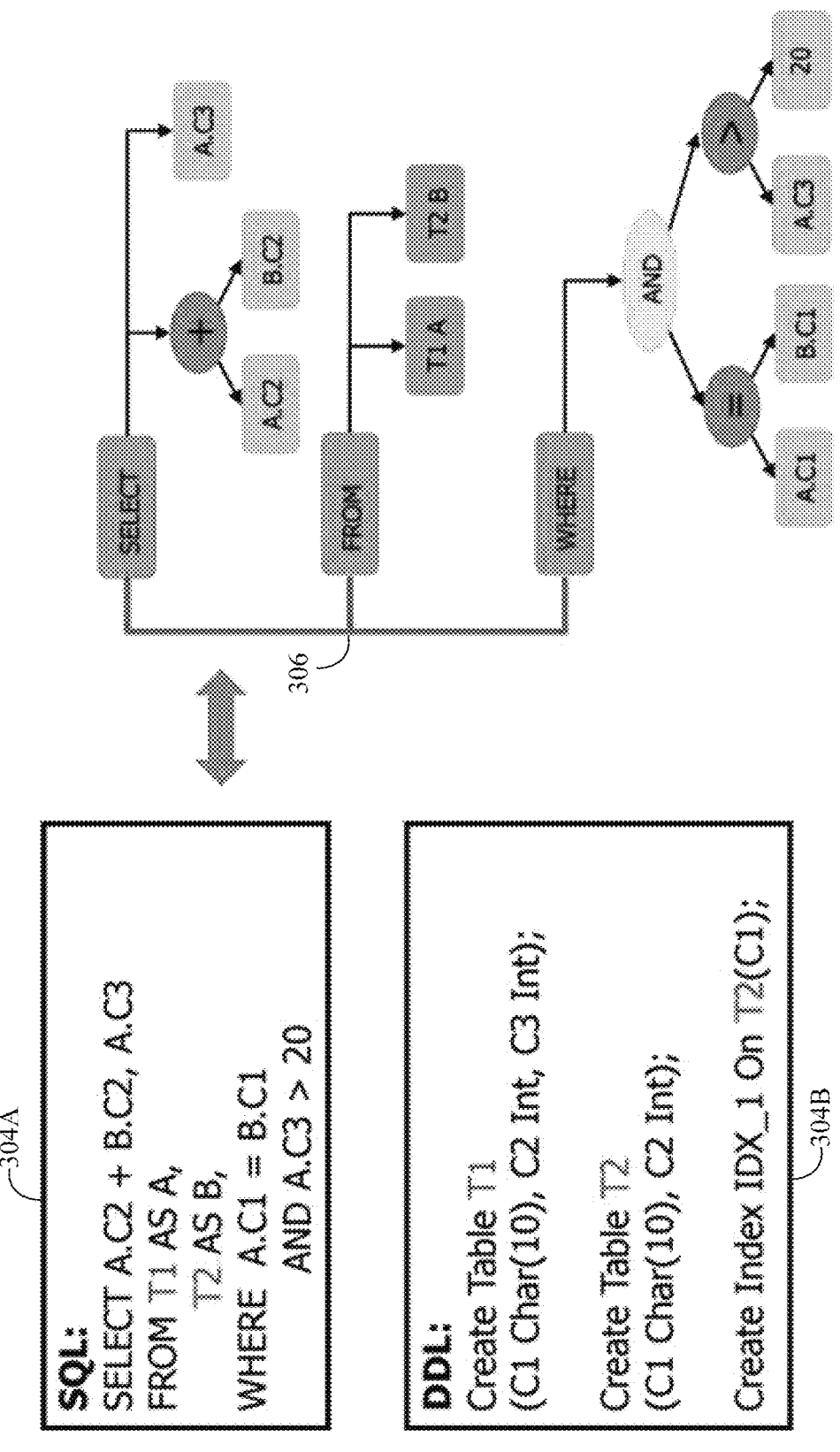
FIG. 3B depicts a SQL parse tree in accordance with one embodiment of the present invention.
Figure 3C:
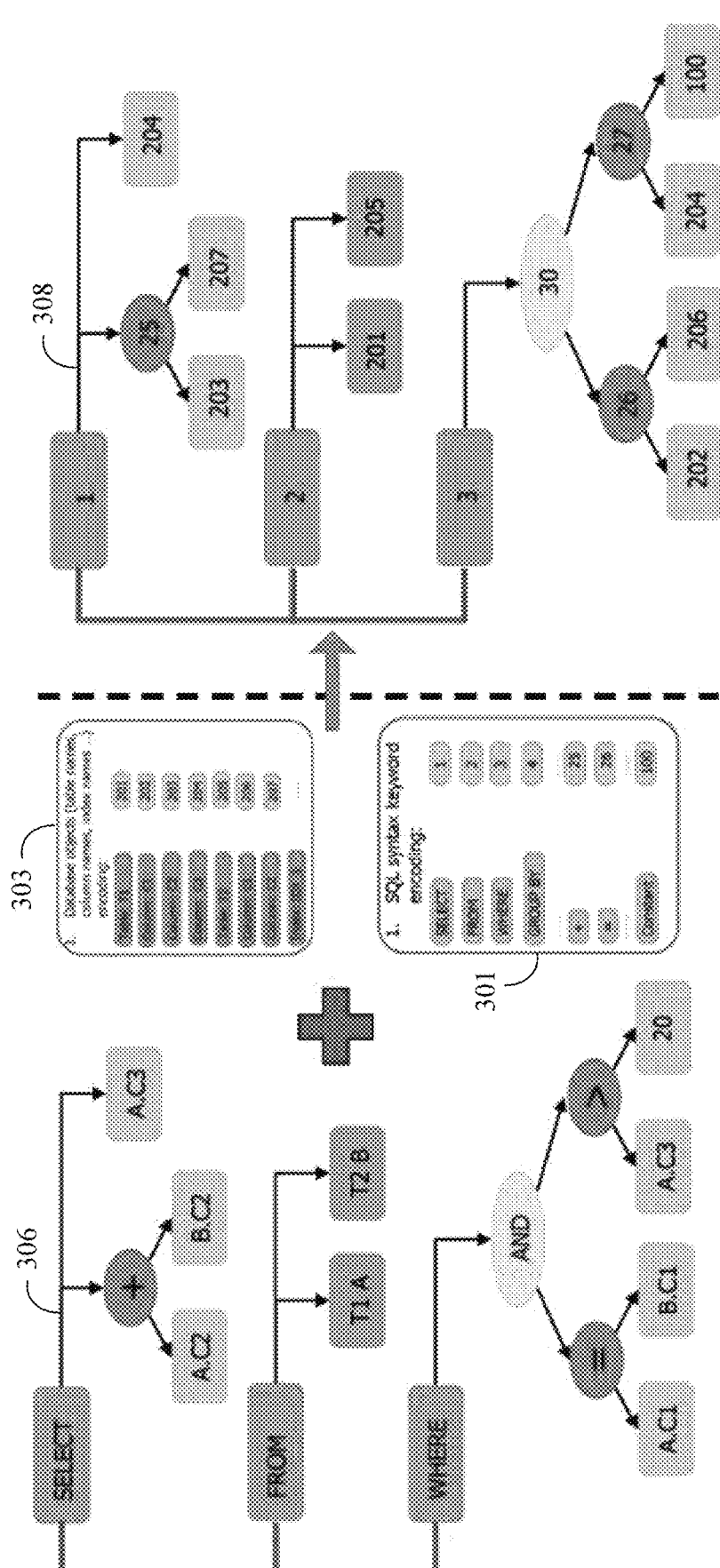
FIG. 3C depicts an encoded SQL tree in accordance with one embodiment of the present invention.

Performing (210) database schema encoding operations may include encoding one or more data items associated with a database of interest. In at least some embodiments, the one or more data items include, but are not limited to, keywords, access path keywords, and data objects. FIG. 3A depicts one example of data encoding with respect to an exemplary embodiment of the present invention. With respect to FIG. 3A, the schema items encoded include SQL keywords, access path keywords, and data objects including table names, column names, index names, etc. Performing (210) database schema encoding operations may further include identifying one or more SQL parse trees corresponding to the database of interest and associated SQL transactions. FIG. 3B depicts one embodiment of an appropriate SQL parse tree in accordance with one embodiment of the present invention. As depicted, the SQL parse tree is created to reflect operations described with respect to one or more SQL transactions, such as those depicted to the left of the depicted SQL parse tree. In at least some embodiments, performing (210) database schema encoding operations includes constructing an SQL tree reflecting the encoded elements. FIG. 3C depicts an encoded SQL tree in accordance with one embodiment of the present invention. As depicted, the encoded SQL tree reflects the same paths and structure as the SQL tree prior to encoding (depicted with respect to FIG. 3B).

Constructing (220) a resource-controlled pool of transactions may include identifying one or more SQL transactions with performance issues. In at least some embodiments, identifying one or more SQL transactions with performance issues includes querying an original resource controller to identify any SQL transactions which have exhibited performance issues previously. In general, performance issues as applied to SQL transactions refer to long runtimes and intense resource requirements with respect to complete execution of said SQL transactions. In at least some embodiments, constructing (220) a resource-controlled pool of transactions includes tagging the one or more SQL transactions identified with performance issues as having performance issues. Constructing (220) a resource-controlled pool of transactions may include generating a table reflecting the one or more SQL transactions which have exhibited performance issues.

Figure 3D:
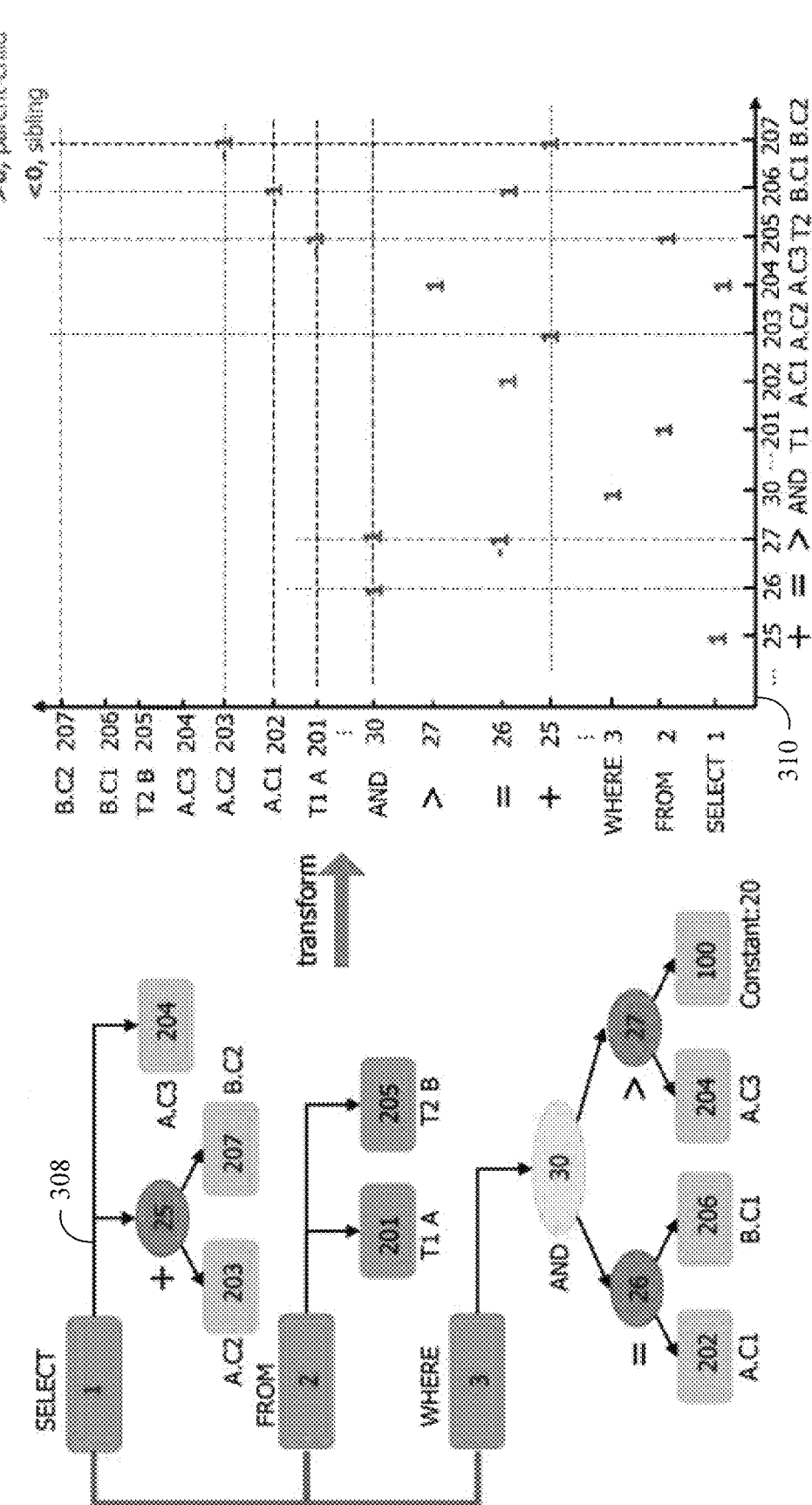
FIG. 3D depicts a SQL tree matrix transformation in accordance with one embodiment of the present invention.
Figure 3E:
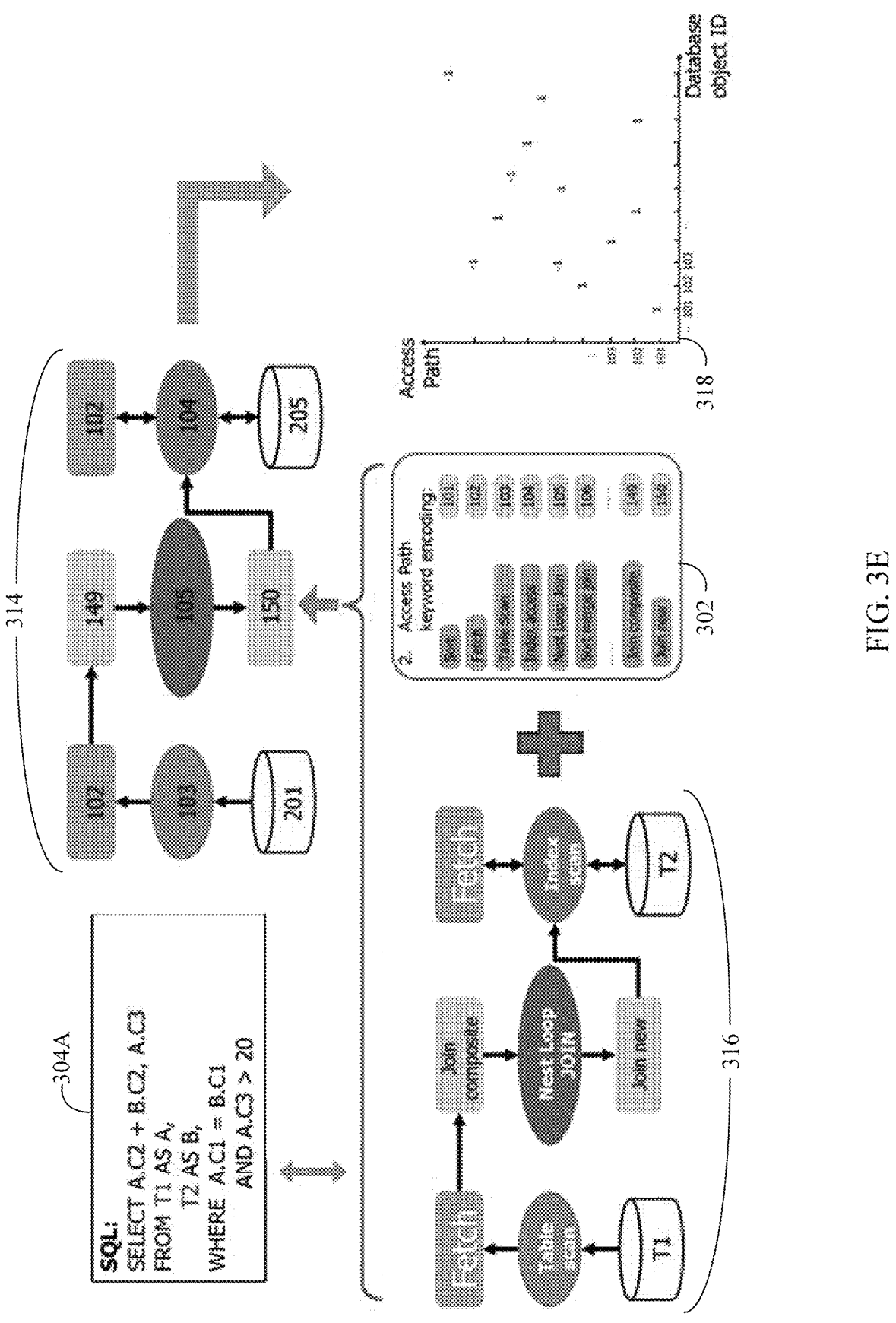
FIG. 3E depicts a SQL access path transformation in accordance with one embodiment of the present invention.
Figure 3F:
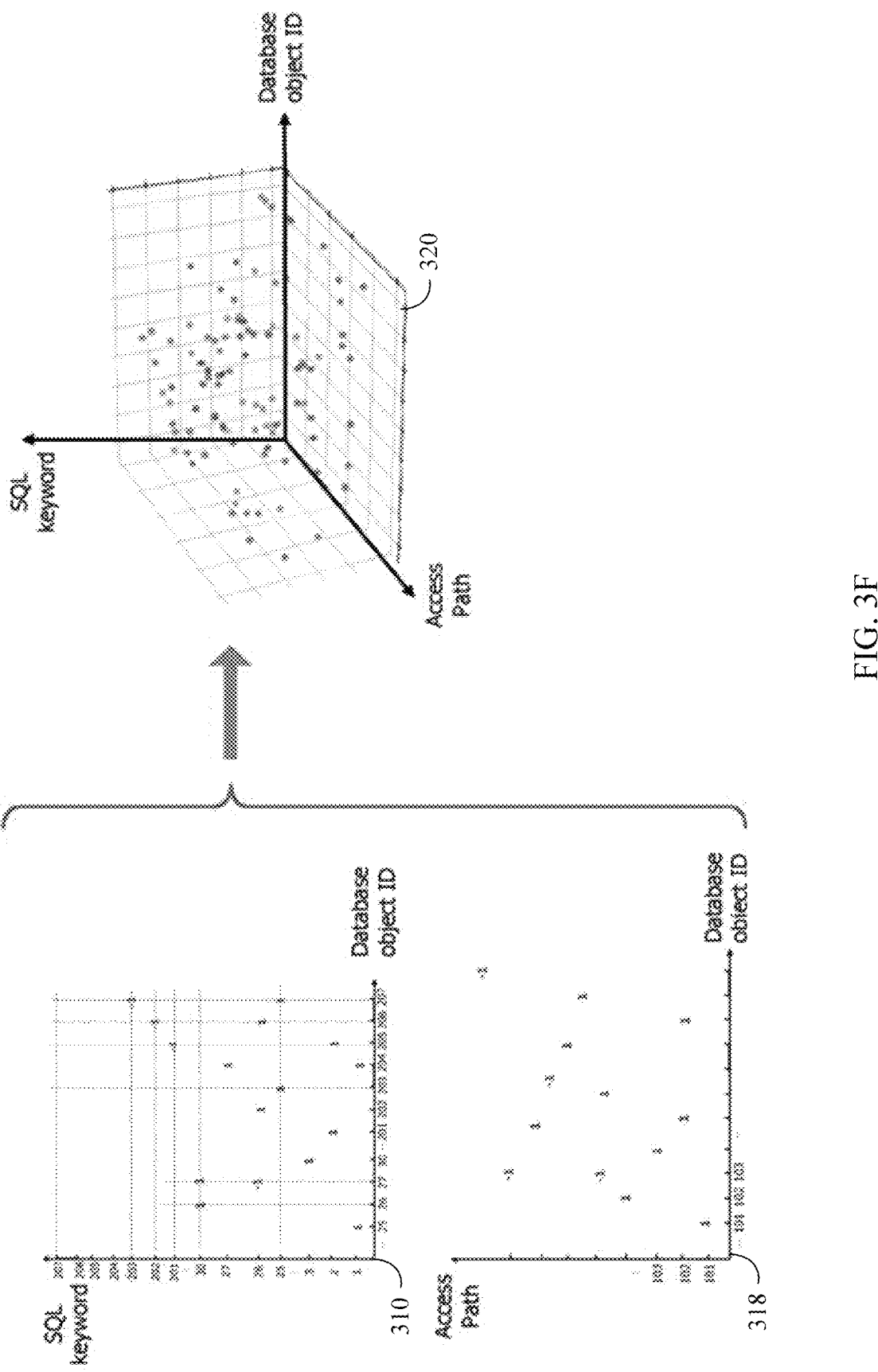
FIG. 3F depicts a SQL tree matrix consolidation in accordance with one embodiment of the present invention.

Transforming (230) an SQL parse tree and corresponding access path tree may include transforming the SQL parse tree and corresponding access path tree to create one or more corresponding matrices. In at least some embodiments, transforming (230) a SQL parse tree and corresponding access path includes creating an SQL tree matrix and an access path matrix based on the encoded SQL tree. FIG. 3D depicts an SQL tree matrix transformation in accordance with one embodiment of the present invention. Similarly, FIG. 3E depicts an SQL access path transformation in accordance with one embodiment of the present invention. Transforming (230) an SQL parse tree and corresponding access path tree may additionally include reconciling the SQL parse tree and corresponding access path tree to create a 3-dimensional matrix, hereinafter referred to as the 'SQL descriptor matrix'. FIG. 3F depicts an SQL descriptor matrix generation in accordance with one embodiment of the present invention. As depicted with respect to FIG. 3F, the SQL descriptor matrix is defined according to the variables database object ID, access path, and SQL keyword. In at least some embodiments, the SQL descriptor matrix generated by transforming (230) a SQL parse tree and corresponding access path tree is referred to as the historical SQL descriptor matrix.

Detecting (240) a new SQL transaction may include monitoring the database of interest to determine when a new SQL transaction request is initiated. In at least some embodiments, detecting (240) a new SQL transaction includes detecting any combination of SQL query operations, including, but not limited to, SELECT, INSERT, UPDATE, MERGE, TRUNCATE, DELETE, ALTER TABLE, ALTER INDEX, etc. In general, detecting (240) a new SQL transaction generally includes identifying one or more newly initiated transactions with respect to the database.

Generating (250) an SQL descriptor matrix corresponding to the new SQL transaction may include, for the new SQL transaction, generating a three-dimensional SQL descriptor matrix reflecting the corresponding SQL keywords, database object IDs, and access paths. Generating (250) an SQL descriptor matrix corresponding to the new SQL transaction may include generating an SQL descriptor matrix in the same format as the historical SQL descriptor matrix developed with respect to the transactions previously executed with respect to the database. In general, generating (250) an SQL descriptor matrix corresponding to the new SQL transaction may include following the same steps and operations as described with respect to transforming (230) an SQL parse tree and corresponding access path tree for the historical operations for the database. The SQL descriptor matrix corresponding to the new SQL transaction may be referred to as a new SQL descriptor matrix.

Figure 3G:
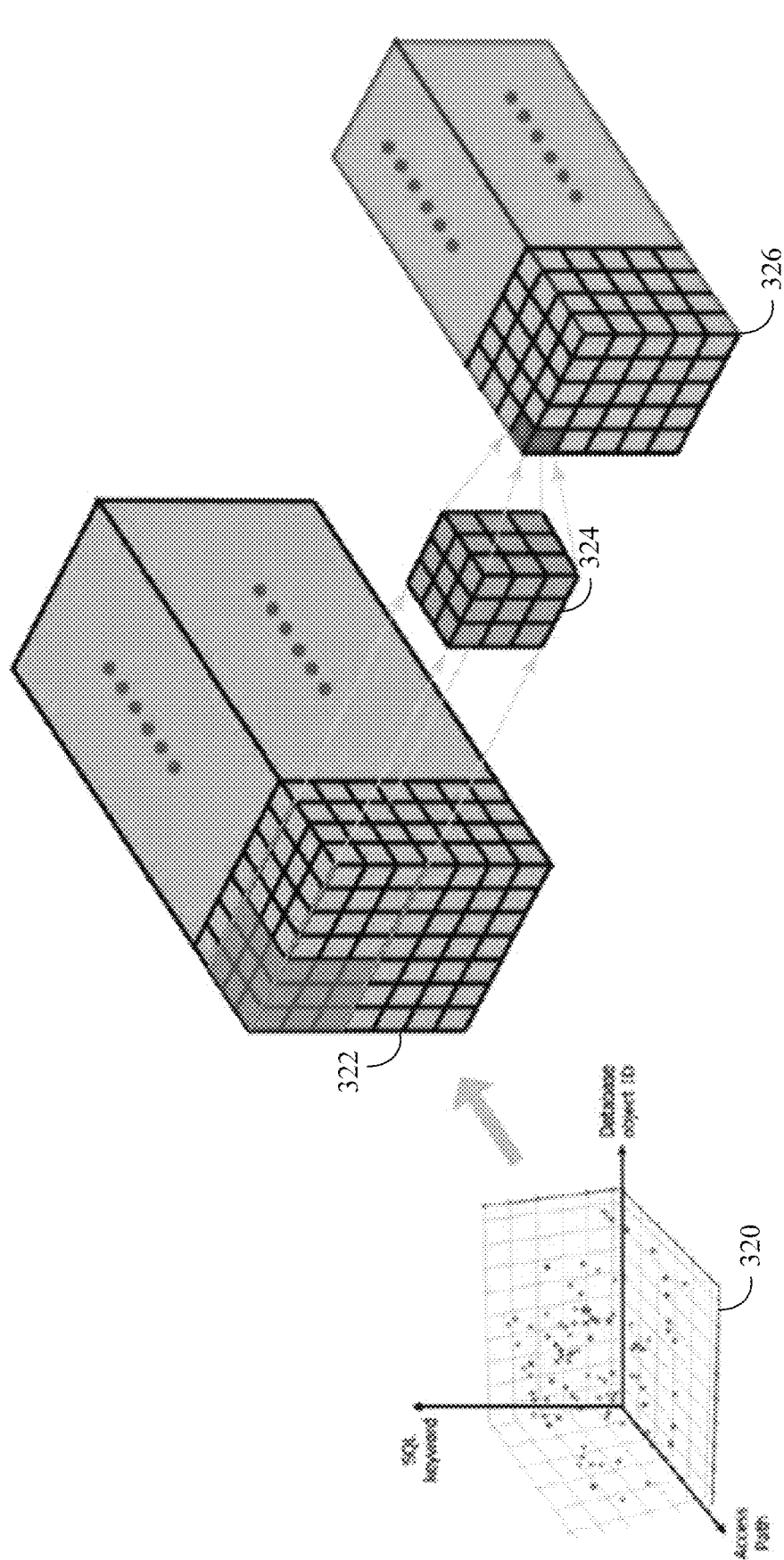
FIG. 3G depicts a dimensional reduction of a SQL descriptor matrix in accordance with one embodiment of the present invention.
Figure 3H:
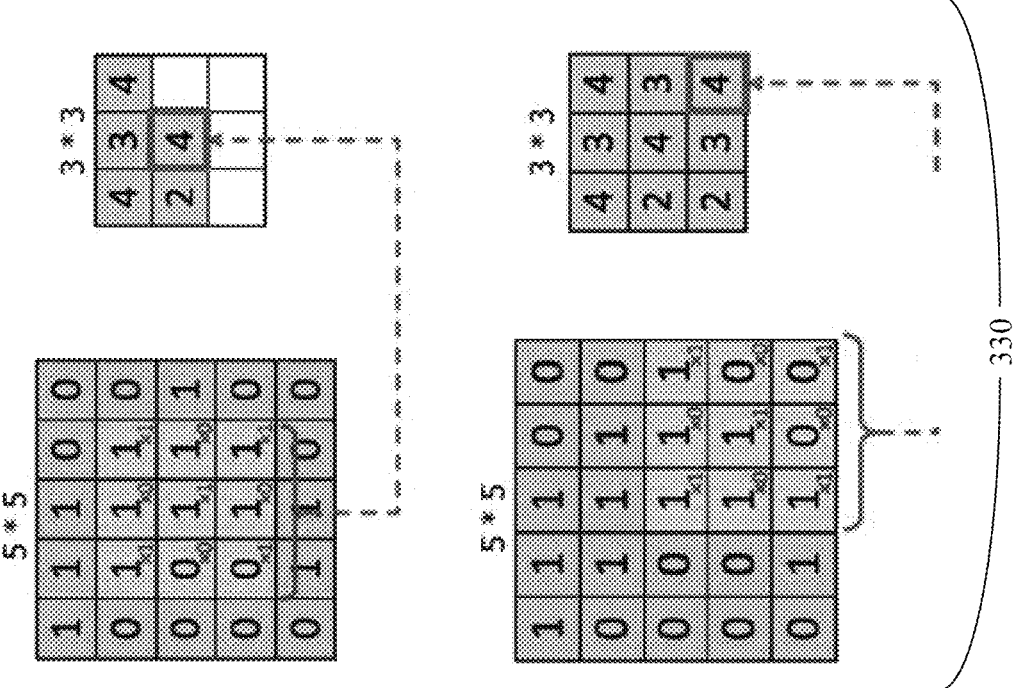
FIG. 3H depicts a dimensional reduction of a SQL descriptor matrix in accordance with one embodiment of the present invention.
Figure 3H:
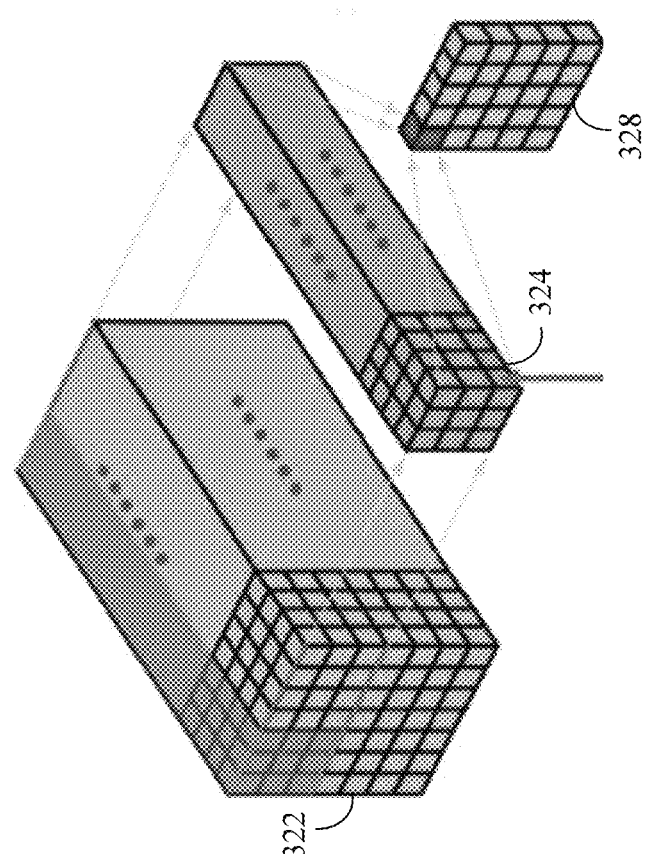

Determining (260) whether a potential performance issue exists may include comparing the new SQL descriptor matrix to the historical SQL descriptor matrix. In at least some embodiments, determining (260) whether a potential performance issue exists includes reducing the dimensions of the new SQL descriptor matrix and the historical SQL descriptor matrix using a multiple layer convolution kernel. As used herein, convolution refers to the process of adding each element of a matrix to its local neighbors, weighted by the kernel. In other words, the multiple layer convolution kernel provides a set of weights according to which matrix elements are combined and subsequently reduced to provide a reduced matrix. In at least some embodiments, the multiple layers of the convolution kernel provide weights for multiple iterations of reduction according to the multiple layer convolution kernel. FIG. 3G depicts a dimensional reduction of a SQL descriptor matrix in accordance with one embodiment of the present invention. In at least some embodiments, reducing the dimensions of the SQL descriptor matrices, for each matrix, includes selecting a layer at a time from a multiple dimensional convolution kernel to be used as a filter to perform the convolution operation with respect to the SQL descriptor matrix. FIG. 3H depicts one example of applying a multiple layer convolution kernel to a SQL descriptor matrix to reduce dimensions. As depicted, the multiple dimensional convolution kernel is applied to a first layer of the SQL descriptor matrix, and the pertinent matrix calculations are depicted accordingly. In at least some embodiments, the multiple dimensional convolution kernel is applied according to the following equations:

$$f(x,y)=a_{x,y}$$

$$g(x,y)=b_{x,y}$$

$$(f*g)(u,v) = \sum\sum f(i,j)g(u-i,v-j) = \sum\sum a_{i,j}b_{u-i,v-j}$$

With respect to the above, functions 'f' and 'g' represent the two matrices for consideration, and (f*g)(u,v) refers to the convolution value of function f and g at position (u,y).

Figure 3I:
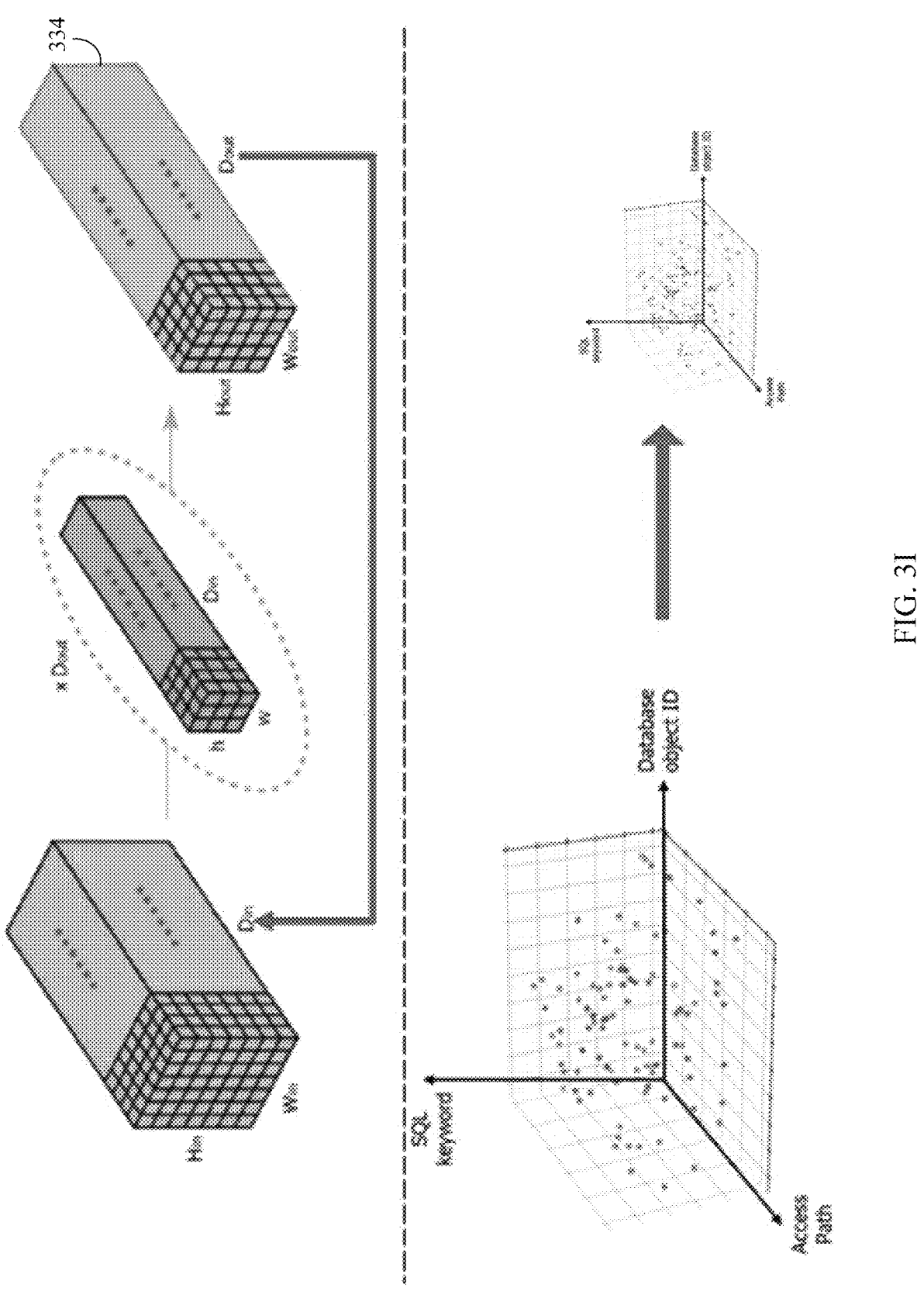
FIG. 3I depicts a dimensional reduction of a SQL descriptor matrix in accordance with one embodiment of the present invention.

In at least some embodiments, multiple dimensional convolution continues iteratively. In other words, the output of the convolution under the $n^{th}$ iteration will subsequently be the input for the $(n+1)^{th}$ convolution. This step can be executed repeatedly until the dimensions are reduced enough. An example of iterative execution of the dimensional reduction is depicted with respect to FIG. 3I. FIG. 3I generally depicts a dimensional reduction of a SQL descriptor matrix in accordance with one embodiment of the present invention.

Subsequent to the dimensional reduction of the SQL descriptor matrices, determining (260) whether a potential performance issue exists may additionally include determining a similarity between the new SQL descriptor matrix and the historical SQL descriptor matrix. Similarity between the matrices may be determined according to the following equations:

$$\text{Vector } A=[a_1, a_2, \ldots, a_n]$$

$$\text{Vector } B=[b_1, b_2, \ldots, b_n]$$

$$\cos\theta = \sum_1^n (A_i, B_i)/\left(\sqrt{\left(\sum_1^n (A_i^2)\right)} * \sqrt{\left(\sum_1^n (B_i^2)\right)}\right) = (A \cdot B)/(|A| \cdot |B|)$$

Value 'a' and 'b' in the above formulas are used to represent each sub-vector value under Vector A and B. If vector A and B overlap completely with each other, mean vector A is the same with B. Namely, the angle between A and B is 0. Thus, $\cos\theta=\cos0=1$, which means the more two vectors are similar, the more value of $\cos\theta$ approaches 1.

In at least some embodiments, comparing the new SQL descriptor matrix to the historical descriptor matrix includes conducting feature extraction with respect to the subject matrices. Feature extraction is a process by which the number of features in a dataset, or in this case, a matrix, is reduced by creating new features which consolidate and thereby minimize the existing features. In general, feature extraction starts from an initial set of measured or existing data, and builds derived values (or features) intended to be informative and non-redundant with respect to the initial set of existing data.

Sending (270) the SQL transaction to a virtual database simulation system may include, responsive to determining that a potential performance issue exists with respect to the new SQL transaction, sending correspondence to a virtual database simulation system indicating that the new SQL transaction requires testing. In at least some embodiments, the virtual database simulation system is configured to execute dummy SQL operations with respect to a database system configured to represent and adequately reflect the conditions of the database system of interest. In at least some embodiments, sending (270) the SQL transaction to a virtual database simulation system includes receiving an indication from the virtual database simulation system of whether or not the SQL transaction indeed does trigger performance issues. The virtual database simulation system may be configured to execute CPU instruction calculations and unit suspension estimations.

Sending (280) the simulation results to feedback database system may include sending the results of the virtual database simulation system's testing to a feedback database system. The feedback database system may be configured to determine one or more recommendations based on the results of the virtual database simulation system's testing. In some embodiments, feedback database system is configured to terminate the SQL transaction, reduce the resources dedicated to the SQL transaction, or suspend the SQL transaction. The feedback database system may additionally be configured to add transactions or queries to a resource controlled pool of transactions. A database resource controller may be configured to dynamically manage the execution of transactions and queries in the resource controlled pool. In at least some embodiments, the simulation results are utilized to adjust convolution; in said embodiments, the results of the simulation may be utilized to adjust weightings of each matrix component, and how the elements of a resultant matrix are determined with respect to the previous matrix values and corresponding weights.

With respect to the above described methods, SQL transactions could be divided into multiple query blocks, wherein the above defined rules and operations can be executed on a query block level rather than a transactional level. In other words, the above implemented methods may be implemented according to the query blocks rather than entire SQL transactions. In embodiments wherein the SQL transactions are initially divided into query blocks, the query blocks may be subsequently divided into subgroups based on shared table dependence.

FIG. 3A through FIG. 3I depict data formats at various steps of transformation with respect to a database management method in accordance with at least one embodiment of the present invention, such as database management method 200 described with respect to FIG. 2.

FIG. 3A depicts an encoding schema 300 in accordance with an embodiment of the present invention; in particular, FIG. 3A depicts a set of SQL syntax keyword encoding data 301, a set of access path keyword encoding data 302, and a set of database object encoding data 303. As depicted, the set of database object encoding data 303 can include, but are not limited to, table names, column names, and index names.

FIG. 3B depicts sample database transactions 304 and their corresponding parse tree transformations; notably, database transactions 304A reflect SQL transactions, and database transactions 304B reflect similar DDL transactions. SQL parse tree 306 in FIG. 3B reflects a tree representation of sample database transactions 304A.

FIG. 3C depicts an implementation of the encoding schema 300 with respect to the SQL parse tree 306; as depicted, SQL parse tree 306 is encoded according to the set of SQL syntax keyword encoding data 301 and the set of database object encoding data 303 to provide encoded SQL parse tree 308.

FIG. 3D depicts a transformation from encoded SQL parse tree 308 to a sparse SQL matrix 310. As depicted, the elements of encoded SQL parse tree 308 are mapped to encoded values as defined by SQL syntax keyword encoding data 301 and database object encoding data 303.

FIG. 3E depicts transformation of an access path 316 corresponding to database transactions 304A to a corresponding sparse access path matrix 318. As depicted, much like the transformation described with respect to FIG. 3C, access path 316 is encoded according to the set of access path keyword encoding data 302 to create encoded access path tree 314. Subsequently, the encoded access path tree 314 is transformed into sparse access path matrix 318. As depicted, the elements of encoded access path tree 314 are mapped to encoded values as defined by access path keyword encoding data 302 to create sparse access path matrix 318.

FIG. 3F depicts matrix consolidation with respect to the sparse SQL matrix 310 and sparse access path matrix 318; notably, sparse SQL matrix 310 and sparse access path matrix 318 are combined or reconciled to provide a 3-dimensional SQL descriptor matrix 320.

FIG. 3G depicts dimensional reduction of a SQL descriptor matrix 320; notably, FIG. 3G depicts a 3-dimensional model 322 corresponding to the SQL descriptor matrix 320, along with a multiple layer convolution kernel 324 via which the dimensions of the SQL descriptor matrix 320 (and corresponding 3-dimensional model 322) to provide a reduced SQL descriptor matrix model 326.

Similarly, FIG. 3H depicts matrix operations 330 by which SQL descriptor matrix model 322 is reduced according to multiple layer convolution kernel 324 to provide a portion 328 of the reduced SQL descriptor matrix model 326.

FIG. 3I depicts iterative dimensional reduction with respect to the subject descriptor matrix; generally, FIG. 3I depicts that, with respect to iterative dimensional reduction, the reduced matrix resultant from the multiple layer convolution kernel's application to the subject descriptor matrix becomes the input matrix to be reduced. In other words, matrix model 334 is the result of a first iteration of dimensional reduction, and is also the input matrix for a subsequent iteration of the dimensional reduction process. FIG. 3I also displays the resultant reduction as exhibited by a 3-dimensional plot.

Figure 4:
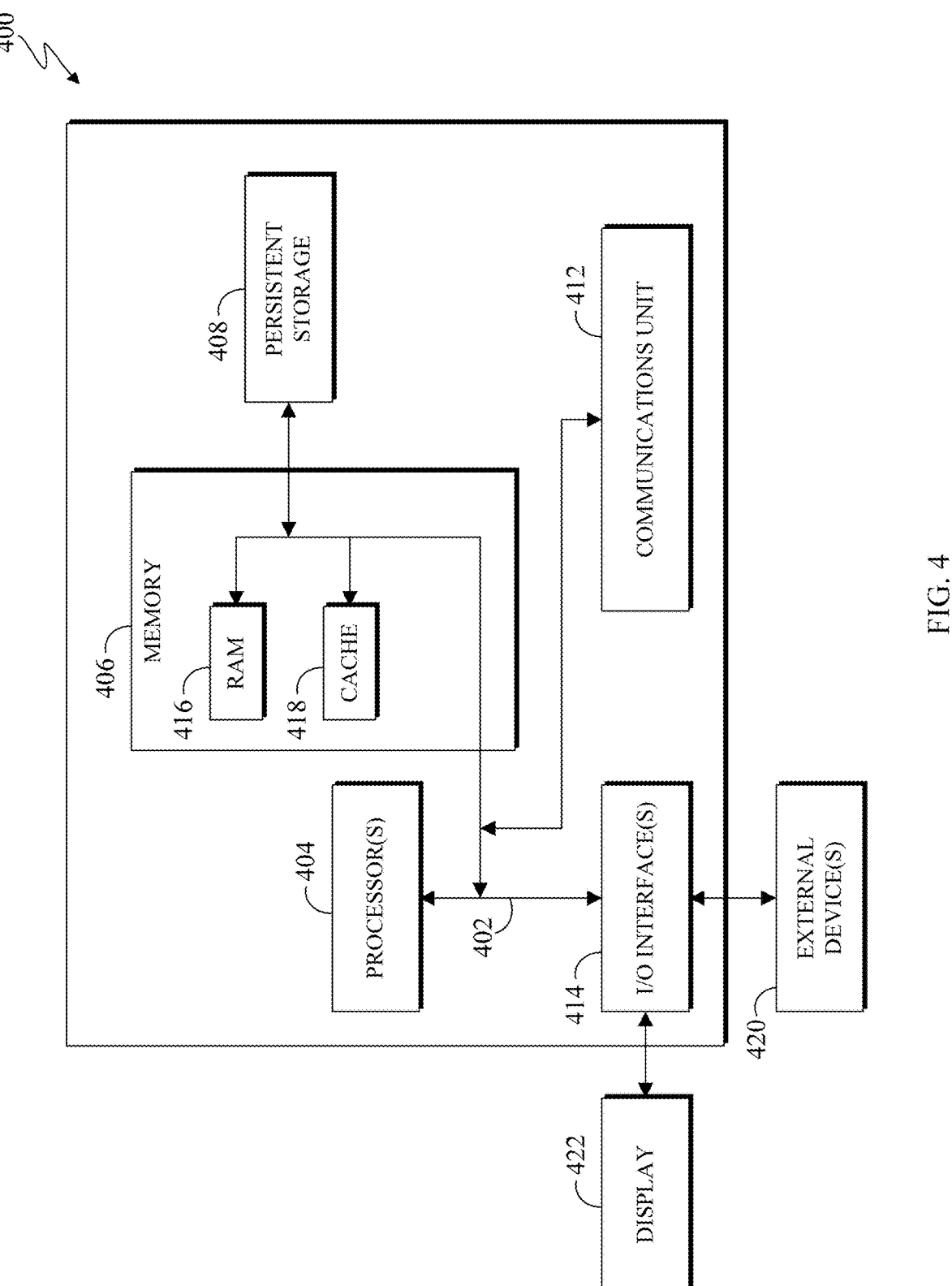
FIG. 4 is a block diagram of components of a computing system in accordance with an embodiment of the present invention.

FIG. 4 depicts a block diagram of components of computing system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage

408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for identifying problematic database operations, the method comprising:
   identifying one or more database transactions which exhibit performance issues and one or more corresponding parse trees;
   transforming the one or more corresponding parse trees to create one or more historical descriptor arrays;
   detecting a new database transaction;
   generating a new descriptor array corresponding to the new database transaction;
   extracting one or more new features from the new descriptor array by consolidating existing features from the new descriptor array;

extracting one or more historical features from the one or more historical descriptor arrays by consolidating existing features from the one or more historical descriptor arrays;
   determining whether the new descriptor array indicates a performance issue corresponding to the new database transaction by comparing the extracted one or more new features from the new descriptor array and the extracted one or more historical features from the one or more historical descriptor arrays; and
   responsive to determining that the new descriptor array indicates a performance issue, adding the new database transaction to a resource controlled pool.

2. The computer implemented method of claim 1, further comprising encoding one or more data items associated with the database.

3. The computer implemented method of claim 1, further comprising sending the new database transaction to a virtual database simulation to simulate the new database transaction's performance.

4. The computer implemented method of claim 3, further comprising sending results of the simulation to a feedback database system.

5. The computer implemented method of claim 1, further comprising reducing the dimensions of the new descriptor array and the one or more historical descriptor arrays.

6. The computer implemented method of claim 5, further comprising comparing the resultant reduced new descriptor array and the resultant one or more reduced historical descriptor arrays.

7. The computer implemented method of claim 6, wherein comparing the resultant reduced new descriptor array and the resultant one or more reduced historical descriptor arrays includes executing a vector similarity determination between the reduced new descriptor array and the one or more reduced historical descriptor array.

8. A computer program product for identifying problematic database operations, the computer program product comprising:
   one or more computer readable storage media and program instructions stored on the one or more computer readable storage media, the program instructions comprising instructions to:
   identify one or more database transactions which exhibit performance issues and one or more corresponding parse trees;
   transform the one or more corresponding parse trees to create one or more historical descriptor arrays;
   detect a new database transaction;
   generate a new descriptor array corresponding to the new database transaction;
   extract one or more features from the new descriptor array and one or more features from the one or more historical descriptor arrays;
   determine whether the new descriptor array indicates a performance issue corresponding to the new database transaction by comparing the extracted one or more features from the new descriptor array and the extracted one or more features from the one or more historical descriptor arrays; and
   responsive to determining that the new descriptor array indicates a performance issue, add the new database transaction to a resource controlled pool.

9. The computer program product of claim 8, wherein the program instructions further comprise instructions to encode one or more data items associated with the database.

10. The computer program product of claim 8, wherein the program instructions further comprise instructions to send the new database transaction to a virtual database simulation to simulate the new database transaction's performance.

11. The computer program product of claim 10, wherein the program instructions further comprise instructions to send results of the simulation to a feedback database system.

12. The computer program product of claim 8, wherein the program instructions further comprise instructions to reduce the dimensions of the new descriptor array and the one or more historical descriptor arrays.

13. The computer program product of claim 12, wherein the program instructions further comprise instructions to compare the resultant reduced new descriptor array and the resultant one or more reduced historical descriptor arrays.

14. The computer program product of claim 13, wherein the program instructions to compare the resultant reduced new descriptor array and the resultant one or more reduced historical descriptor arrays comprise instructions to execute a vector similarity determination between the reduced new descriptor array and the one or more reduced historical descriptor array.

15. A computer system for identifying problematic database operations, the computer system comprising:
  one or more computer processors;
  one or more computer-readable storage media;
  program instructions stored on the computer-readable storage media for execution by at least one of the one or more processors, the program instructions comprising instructions to:
    identify one or more database transactions which exhibit performance issues and one or more corresponding parse trees;
    transform the one or more corresponding parse trees to create one or more historical descriptor arrays;
    detect a new database transaction;

generate a new descriptor array corresponding to the new database transaction;
    extract one or more features from the new descriptor array and one or more features from the one or more historical descriptor arrays;
    determine whether the new descriptor array indicates a performance issue corresponding to the new database transaction by comparing the extracted one or more features from the new descriptor array and the extracted one or more features from the one or more historical descriptor arrays; and
    responsive to determining that the new descriptor array indicates a performance issue, add the new database transaction to a resource controlled pool.

16. The computer system of claim 15, wherein the program instructions further comprise instructions to send the new database transaction to a virtual database simulation to simulate the new database transaction's performance.

17. The computer system of claim 16, wherein the program instructions further comprise instructions to send results of the simulation to a feedback database system.

18. The computer system of claim 15, wherein the program instructions further comprise instructions to reduce the dimensions of the new descriptor array and the one or more historical descriptor arrays.

19. The computer system of claim 18, wherein the program instructions further comprise instructions to compare the resultant reduced new descriptor array and the resultant one or more reduced historical descriptor arrays.

20. The computer system of claim 19, wherein the program instructions to compare the resultant reduced new descriptor array and the resultant one or more reduced historical descriptor arrays comprise instructions to execute a vector similarity determination between the reduced new descriptor array and the one or more reduced historical descriptor array.

* * * * *